(12) United States Patent
Kuzusako et al.

(10) Patent No.: US 9,636,870 B2
(45) Date of Patent: May 2, 2017

(54) MODELING APPARATUS AND MODELING METHOD

(75) Inventors: Junichi Kuzusako, Saitama (JP);
Masanobu Yamamoto, Kanagawa (JP);
Akira Ookubo, Tokushima (JP);
Toshihiro Kamewa, Tokushima (JP);
Tomohide Koizumi, Tokushima (JP);
Kazuma Tamura, Tokushima (JP);
Takeshi Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 248 days.

(21) Appl. No.: 12/736,718

(22) PCT Filed: May 14, 2009

(86) PCT No.: PCT/JP2009/059008
§ 371 (c)(1),
(2), (4) Date: Nov. 3, 2010

(87) PCT Pub. No.: WO2009/145069
PCT Pub. Date: Dec. 3, 2009

(65) Prior Publication Data
US 2011/0059247 A1    Mar. 10, 2011

(30) Foreign Application Priority Data

May 26, 2008 (JP) ................................. 2008-136811

(51) Int. Cl.
*B29C 31/00* (2006.01)
*B29C 67/00* (2017.01)
(Continued)

(52) U.S. Cl.
CPC ............ *B29C 67/0081* (2013.01); *B22C 7/02* (2013.01); *B22C 9/00* (2013.01)

(58) Field of Classification Search
CPC ............ B29C 67/0081; B29C 67/0085; B29C 67/0077; B29C 35/0805; B41J 3/4073
(Continued)

(56) References Cited

U.S. PATENT DOCUMENTS 4,965,434 A * 10/1990 Nomura et al. .............. 392/407
6,007,318 A * 12/1999 Russell et al. ............... 425/130
(Continued)

FOREIGN PATENT DOCUMENTS

JP    2001-524897 T    12/2001
JP    2002-307562      10/2002
(Continued)

OTHER PUBLICATIONS

International Search Report; International Application No. PCT/JP2009/059008; Dated: Jun. 9, 2009. (Form PCT/ISA/210).
(Continued)

*Primary Examiner* — Timothy Kennedy
(74) *Attorney, Agent, or Firm* — Michael Best & Friedrich LLP

(57) ABSTRACT

A powder transfer mechanism laminates powder layers containing water-soluble powder as a main component one by one at a modeling portion. An inkjet line head injects a water-based ink that dissolves the powder in an area of an uppermost layer of the powder layers laminated by the powder transfer mechanism, the area corresponding to a cross-sectional shape of a modeled object. Then, a heater heats the powder for each layer of the powder layers. Further, the heater heats the powder after the water-based ink is injected by the inkjet line head or before the water-based ink is injected by the inkjet line head. The present invention can be applied to a modeling apparatus, for example.

22 Claims, 6 Drawing Sheets

(51) Int. Cl.
*B22C 7/02* (2006.01)
*B22C 9/00* (2006.01)

(58) Field of Classification Search
USPC .............................................. 425/174, 174.4
See application file for complete search history.

(56) References Cited

U.S. PATENT DOCUMENTS

| | | | |
|---|---|---|---|
| 6,403,002 | B1 | 6/2002 | van der Geest |
| 6,578,947 | B1* | 6/2003 | Suwabe et al. ................. 347/29 |
| 6,799,959 | B1 | 10/2004 | Tochimoto et al. |
| 2002/0105114 | A1 | 8/2002 | Kubo et al. |
| 2003/0133822 | A1* | 7/2003 | Harryson ................ B22F 3/004 419/35 |
| 2004/0004653 | A1* | 1/2004 | Pryor et al. ................... 347/106 |
| 2006/0099287 | A1* | 5/2006 | Kim et al. ................. 425/174.4 |

FOREIGN PATENT DOCUMENTS

| | | | |
|---|---|---|---|
| JP | 2004-082206 | 3/2004 | |
| JP | 2005-297325 | 10/2005 | |
| WO | WO-98/51477 | 11/1998 | |
| WO | WO-03/016030 A1 | 2/2003 | |
| WO | WO-2004/005014 A2 | 1/2004 | |
| WO | WO 2007039450 A1 * | 4/2007 | ......... B29C 67/0081 |
| WO | WO-2007/077731 | 7/2007 | |
| WO | WO 2007114895 A2 * | 10/2007 | |

OTHER PUBLICATIONS

Extended European Search Report issued Dec. 17, 2012 for corresponding European Application No. 09 75 4577.
Communication Pursuant to Article 94(3) EPC issued Nov. 25, 2014 for corresponding European Application No. 09 754 577.6.

* cited by examiner

| Naming | Without heating | | Naming | With heating 120°C | |
|---|---|---|---|---|---|
| | Time until dried min | Moisture amount % | | Time until dried min | Moisture amount % |
| N1 | 14.3 | 10.21 | H1 | 13.5 | 7.58 |
| N2 | 14.9 | 9.16 | H2 | 12.3 | 6.94 |
| Average value | 14.6 | 9.69 | Average value | 12.9 | 7.26 |

FIG.5

| Material | Naming of color | Optical density OD | | | | Lightness | Chromaticity | | Chroma |
|---|---|---|---|---|---|---|---|---|---|
| | | V | C | M | Y | L* | a* | b* | c* |
| Salt | Cyan | 0.40 | 0.53 | 0.27 | 0.25 | 71.38 | -20.99 | -13.28 | 24.84 |
| | Magenta | 0.52 | 0.29 | 0.80 | 0.46 | 58.17 | 50.15 | -14.52 | 52.21 |
| | Yellow | 0.10 | 0.07 | 0.15 | 0.81 | 89.65 | -1.71 | 75.90 | 75.92 |
| | White | 0.06 | 0.06 | 0.07 | 0.07 | 94.32 | 0.27 | 0.43 | 0.51 |
| Gypsum | Cyan | 0.51 | 0.67 | 0.40 | 0.38 | 64.17 | -18.79 | -11.43 | 21.99 |
| | Magenta | 0.59 | 0.33 | 0.85 | 0.58 | 54.82 | 43.25 | -8.33 | 44.04 |
| | Yellow | 0.28 | 0.24 | 0.34 | 0.77 | 76.02 | 0.43 | 50.94 | 50.94 |
| | White | 0.28 | 0.26 | 0.30 | 0.32 | 77.30 | 2.98 | 3.21 | 4.38 |

FIG.6

MODELING APPARATUS AND MODELING METHOD

TECHNICAL FIELD

The present invention relates to a modeling apparatus and a modeling method, and more particularly, to a modeling apparatus and a modeling method that are capable of forming a modeled object with high accuracy.

BACKGROUND ART

Generally in a three-dimensional laminate modeling, cross-sectional shape data is created by slicing three-dimensional shape data of a modeled object that is created by CAD (Computer Aided Design). Then, based on the cross-sectional shape data, thin plates having a cross-sectional shape obtained by slicing the modeled object are created and laminated as in a case where a three-dimensional contour map is created, thus forming the modeled object. The three-dimensional laminate modeling is a modeling method as described above and one method of additive manufacturing.

For example, examples of the three-dimensional laminate modeling include optical modeling that uses a light-curing resin, powder laminate modeling that uses powder, fused-resin deposition modeling that deposits a fused resin, and laminated object manufacturing that laminates paper sheets, plastic sheets, or thin plates of metal or the like, depending on materials used for modeling.

Further, examples of the three-dimensional laminate modeling include, as a system of creating a thin plate, an inkjet system of creating a thin plate of a cross-sectional shape by injecting a minute amount of liquid. In the three-dimensional laminate modeling by the inkjet system, the powder laminate modeling, the fused-resin deposition modeling, the optical modeling, and the like are put into practical use.

For example, in the powder laminate modeling, a layer made of starch or powder of gypsum or ceramics is formed, a binder is injected on a surface thereof by an inkjet, and the powder is firmly fixed by the binder drawn in accordance with a cross-sectional shape, thus forming a thin plate. Further, in the fused-resin deposition modeling, fused wax or the like is injected by an inkjet and the wax or the like drawn in accordance with a cross-sectional shape is solidified, thus forming a thin plate. In the optical modeling, a liquid light-curing resin is injected by an inkjet to form a layer and the layer of the light-curing resin is cured by light applied in accordance with a cross-sectional shape, thus forming a thin plate.

In addition, Patent Document 1 discloses powder laminate modeling using salt powder. For example, Patent Document 1 discloses that "when a liquid containing water as a main component is sprayed, salt powder is dissolved into the sprayed liquid and a volume is decreased, and a fluctuation in layer thickness is caused. If salt is dissolved into an injected liquid up to saturation or a state close thereto, the salt powder is not dissolved when the liquid is injected or sprayed to the salt powder. Thus, as a result of keeping a thickness of the powder layer constant, dimension accuracy can be improved".

Further, Patent Document 1 discloses, as an effect of the invention thereof, that "a model that is soluble in water, easy to be detached from a mold, and harmless can be realized" and "the combination of salt and an fixing agent with heat resistance imparts heat resistance as well as disappearance property, and a disappearance model model for precision casting can be realized".

Patent Document 1: Japanese Patent Application Laid-open No. 2004-82206

DISCLOSURE OF THE INVENTION

Problem to be Solved by the Invention

However, water-soluble powder generally has absorbency that moisture in the air is easy to be absorbed. Therefore, when moisture is supplied to a powder layer to form a thin plate and another powder layer is formed thereon to form a next thin plate, for example, excessive moisture supplied to the lower powder layer may infiltrate in a vapor or liquid state into the powder layer in which a thin plate is to be formed. As a result, areas other than the area corresponding to a cross-sectional shape of a modeled object may be solidified in the powder layer in which a thin plate is to be formed.

As described above, there has been a reduction in dimension accuracy of a modeled object by the infiltration of excessive moisture. Further, even when a modeled object is formed under a dry atmosphere in order to avoid an adverse influence due to the infiltration of excessive moisture, it has been difficult to reliably prevent moisture from infiltrating and impossible to avoid the adverse influence perfectly.

The present invention has been made in view of the circumstances as described above and is configured to be capable of forming a modeled object with high accuracy.

Means for Solving the Problem

According to an aspect of the present invention, there is provided a modeling apparatus including: a lamination means for laminating powder layers containing water-soluble powder as a main component one by one; a liquid supply means for supplying liquid that dissolves the powder to an area of an uppermost layer of the powder layers laminated by the lamination means, the area corresponding to a cross-sectional shape of a modeled object; and a heating means for heating the powder for each layer of the powder layers.

According to an aspect of the present invention, there is provided a modeling method including: laminating powder layers containing water-soluble powder as a main component one by one; supplying liquid that dissolves the powder to an area of an uppermost layer of the laminated powder layers, the area corresponding to a cross-sectional shape of a modeled object; and heating the powder for each layer of the powder layers.

According to an aspect of the present invention, powder layers containing water-soluble powder as a main component are laminated one by one and liquid that dissolves the powder is supplied to an area of an uppermost layer of the laminated powder layers, the area corresponding to a cross-sectional shape of a modeled object. Then, the powder is heated for each layer of the powder layers.

Effect of the Invention

According to an aspect of the present invention, a modeled object with high accuracy can be formed.

BRIEF DESCRIPTION OF DRAWINGS

FIG. 5 is a table indicating results of an experiment in which a time until when a modeled object is dried naturally after formed is measured with and without heat treatment using a heater.

FIG. 6 is a table indicating results of an experiment in which color developability of a modeled object by a salt material and that of a modeled object by a gypsum material are compared.

BEST MODE FOR CARRYING OUT THE INVENTION

Hereinafter, a specific embodiment to which the present invention is applied will be descried in detail with reference to the drawings.

Figure 1:
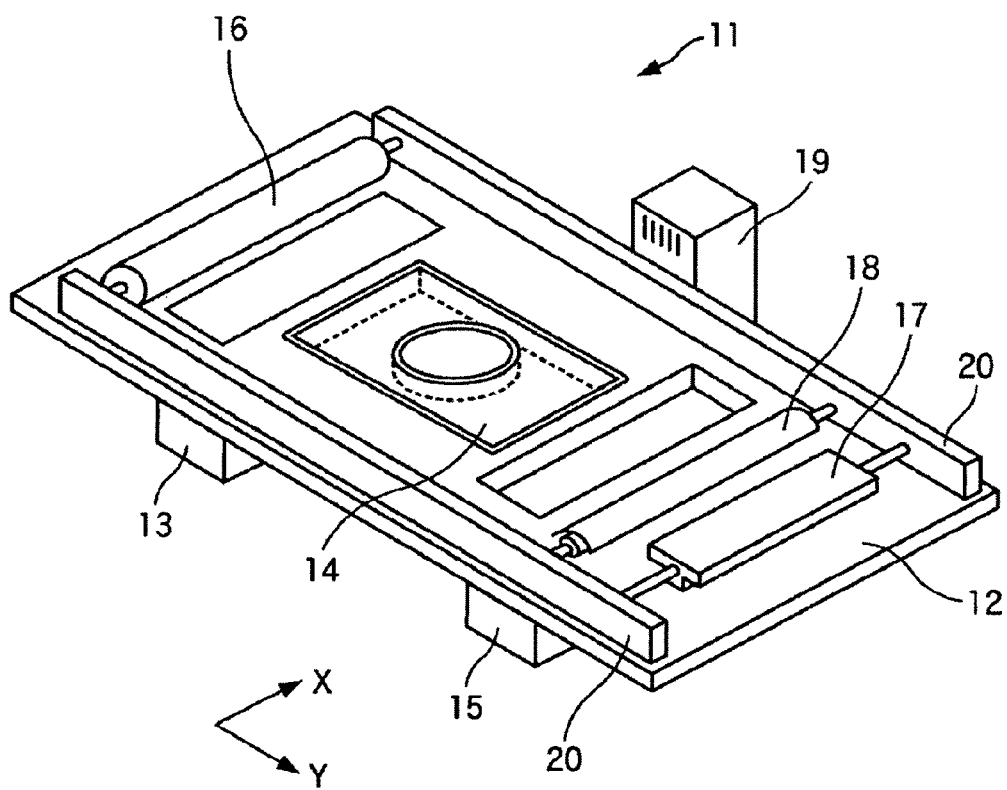
FIG. 1 is a perspective view showing a structural example of an embodiment of a modeling apparatus to which the present invention is applied.

FIG. 1 is a perspective view showing a structural example of an embodiment of a modeling apparatus to which the present invention is applied.

In FIG. 1, a modeling apparatus 11 is constituted of a working base 12, a powder supply portion 13, a modeling portion 14, a powder discharge portion 15, a powder transfer mechanism 16, an inkjet line head 17, a heater 18, a dehumidification portion 19, and drive shafts 20.

The working base 12 is a base on which an operation to form a modeled object is performed. The powder supply portion 13, the modeling portion 14, and the powder discharge portion 15 are arranged below the working base 12, and the powder transfer mechanism 16, the inkjet line head 17, the heater 18, and the drive shafts 20 are arranged thereabove. Further, the working base 12 is provided with an opening corresponding to a supply area where the powder supply portion 13 supplies powder, an opening corresponding to a modeling area where a modeled object is formed in the modeling portion 14, and an opening corresponding to a discharge area where powder is discharged in the powder discharge portion 15.

Further, on the working base 12, the powder transfer mechanism 16, the inkjet line head 17, and the heater 18 are moved along the drive shafts 20, and a direction in which those parts move is assumed as a Y direction and a direction perpendicular to the Y direction is assumed as an X direction. Further, the opening corresponding to the supply area, the opening corresponding to the modeling area, and the opening corresponding to the discharge area are arranged side by side in the stated order in the Y direction.

The powder supply portion 13 accommodates powder therein and pushes out the powder upwardly from below the working base 12, thus supplying the powder above an upper surface of the working base 12 from the opening corresponding to the supply area of the working base 12. For example, when forming one powder layer, the powder supply portion 13 supplies powder whose amount is a little larger than that of one layer to the upper surface of the working base 12.

The modeling portion 14 is constituted to include a table (table 14A of FIG. 2) that downwardly moves powder layers laminated in the opening corresponding to the modeling area. Each time one cured layer is formed, the table is lowered by a thickness corresponding to the one layer. The table of the modeling portion 14 is lowered in this manner, with the result that a gap between upper surfaces of the cured layer and uncured powder layer that are formed on the upper surface of the table and the upper surface of the working base 12 corresponds to a thickness of the cured layer.

In the powder discharge portion 15, the remaining powder that is supplied from the powder supply portion 13 and transferred to the modeling portion 14 by the powder transfer mechanism 16 is discharged from the opening corresponding to the discharge area of the working base 12.

Here, water-soluble powder is used for forming a modeled object in the modeling portion 14. For example, inorganic matters such as salt, magnesium sulfate, magnesium chloride, potassium chloride, and sodium chloride, and organic matters such as polyvinylpyrrolidone, polyvinyl alcohol, carboxymethylcellulose, polyacrylic ammonium, sodium polyacrylate, methacrylic ammonium, sodium methacrylate, and copolymers thereof can be used. Further, it is desirable to use salt powder for the powder, and particularly, a mixture of salt (NaCl) and a bittern component (magnesium sulfate, magnesium chloride, potassium chloride, etc.) is preferable. In addition, an average particle diameter is preferably 10 μm or more and 100 μm or less.

The powder transfer mechanism 16 is constituted of a roller that moves along the drive shafts 20. With the roller being rotated, the powder supplied to the supply area by the powder supply portion 13 is transferred to the modeling area.

As described above, in the modeling portion 14, the gap between the upper surfaces of the cured layer and uncured powder layer and the upper layer of the working base 12 is provided in accordance with the thickness of the cured layer, and the powder transfer mechanism 16 fills the gap with powder while transferring the powder. Accordingly, the powder is leveled uniformly in the thickness corresponding to one cured layer in the modeling area. In addition, the powder transfer mechanism 16 transfers the powder whose amount exceeds an amount necessary for forming a powder layer to the opening corresponding to the discharge area beyond the modeling area and then discharges the powder to the powder discharge portion 15. It should be noted that the powder transfer mechanism 16 may be constituted of, for example, a squeegee to level the powder instead of using a roller to rotate.

The inkjet line head 17 includes a plurality of injection ports to inject a water-based ink in minute droplets by a so-called inkjet system, and injects the water-based ink from the plurality of injection ports to supply the water-based ink to an area of a powder layer formed in the modeling portion 14, the area corresponding to a cross-sectional shape of a modeled object. Accordingly, the powder is dissolved by infiltration of the water-based ink into the powder layer and then cured, with the result that a cured layer (thin plate) corresponding to the cross-sectional shape of the modeled object is formed.

Further, in the inkjet line head 17, the plurality of injection ports are constituted to be arranged side by side over a width of the modeling portion 14 in the X direction such that the water-based ink is simultaneously injected in a line in the X direction. Further, the inkjet line head 17 injects the water-based ink on the entire surface of the modeling area while repeating the injection of the water-based ink at the same time in a line in the X direction and the movement of one line in the Y direction, that is, by a line shot system.

For example, the inkjet line head 17 injects five water-based inks including four color inks of cyan, magenta, yellow, and black and a transparent colorless ink. It should be noted that with the five injection ports that inject the respective five water-based inks as described above being assumed as one set, a plurality of sets are provided in the inkjet line head 17 along the X direction at predetermined pitches over the width of the modeling portion 14 in the X direction. Further, as the color inks, inks used in an inkjet printer commercially available, that is, those containing pigments or dyes dispersed or dissolved in a mixed solution constituted of water and an alcohol component are used. In addition, a mixed solution containing no pigments or dyes is used for the colorless ink.

Figure 2:
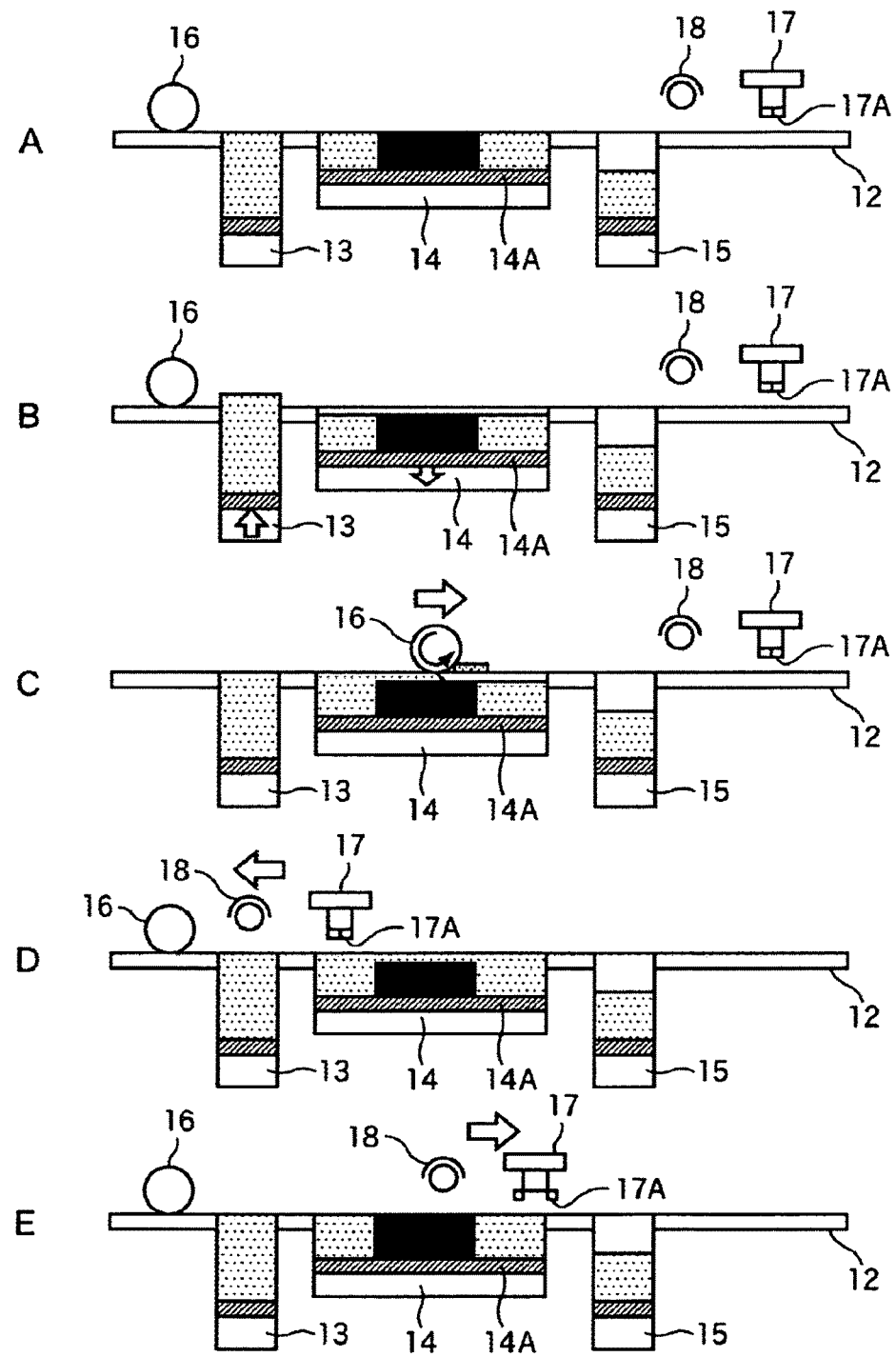
FIG. 2 are diagrams for explaining steps of forming a modeled object by a modeling apparatus 11.

The inkjet line head 17 is also provided with a lid 17A to cover the injection ports of the water-based ink as shown in FIG. 2 to be described later. Specifically, to prevent the injection ports from being clogged by dried water-based ink, the injection ports are covered with the lid 17A except a time when a water-based ink is injected, to thereby suppress drying of the water-based ink. Further, the drying of the water-based ink is also suppressed by setting a standby position where the inkjet line head 17 is on standby during the transfer of the powder by the powder transfer mechanism 16 (position at which the inkjet line head 17 is shown in FIG. 1) apart from the dehumidification portion 19.

For the heater 18, an electric heater that generates far infrared rays or the like is used. The heater 18 heats the powder layer while moving along with the movement of the inkjet line head 17.

Here, the far infrared rays refer to electromagnetic waves having wavelengths from 4 µm to 1,000 µm in regions up to super far infrared rays. As the heater 18, it is preferable to use one whose amount of heat in a far infrared region is at least 50% or more. Specifically, a wavelength region of heat rays that generate an amount of heat is in a range from 0.76 to 1,000 µm, in which a range from 0.76 to 1.6 µm is near-infrared rays, a range from 1.6 to 4 µm is mid-infrared rays, a range from 4 to 25 µm is far infrared rays, and a range from 25 to 1,000 µm is super far infrared rays (in a broader sense, 4 µm or more may be referred to as far infrared rays). It is preferable that 50% or more of an amount of heat to be applied fall in a wavelength region of 4 µm to 1,000 µm.

For example, when a heater whose amount of heat of the far infrared rays is less than 50% is used in the modeling apparatus 11, the powder layer is excessively heated in some cases, and there is a fear that the water-based ink injected on the powder layer by the inkjet line head 17 is dried before sufficiently infiltrating. In this case, the powder layers cannot be firmly fixed to each other at a sufficient strength, with the result that a modeled object is apt to be broken. Further, since the powder itself is heated and the entire temperature is raised in normal infrared heating, there is a fear that this becomes a cause of the clogging. On the other hand, since only the moisture contained in salt powder is heated in far infrared heating, it is possible to suppress the generation of the clogging. As described above, it is desirable to use a heater whose amount of heat in the far infrared region is at least 50% or more as the heater 18.

The dehumidification portion 19 is arranged in the vicinity of the modeling portion 14, for example, and removes water vapor in a space including the powder layers laminated in the modeling area to dry the atmosphere of the space. For example, the dehumidification portion 19 performs dehumidification such that humidity becomes 80% or less.

The drive shafts 20 are provided to extend in the Y direction on both sides of the working base 12. The drive shafts 20 transmit power from a drive unit (not shown) to the powder transfer mechanism 16, the inkjet line head 17, and the heater 18 and drives them in the Y direction.

Next, steps of forming a modeled object by the modeling apparatus 11 will be described with reference to FIG. 2.

FIG. 2 are diagrams of the modeling apparatus 11 of FIG. 1 seen from the X direction (partial cross-sectional diagrams). Further, FIGS. 2A to 2E show steps of forming one cured layer, in which powder and an uncured powder layer are shown by hatching with dots and a cured layer is shown in black.

As shown in FIG. 2A, the table 14A of the modeling portion 14 is in a state where a cured layer and an uncured powder layer are laminated. In this state, a step of forming one cured layer is started. In FIG. 2A, positions at which the powder transfer mechanism 16, the inkjet line head 17, and the heater 18 are shown are standby positions thereof.

First, as shown in FIG. 2B, in the powder supply portion 13, the powder accommodated in the powder supply portion 13 is pushed up and powder whose amount is a little larger than that of one powder layer is supplied above the upper surface of the working base 12. Further, in the modeling portion 14, the table 14A is lowered to provide a gap having a thickness corresponding to one powder layer (cured layer) between the upper layers of the cured layer and uncured powder layer and the upper layer of the working base 12.

After that, as shown in FIG. 2C, the powder transfer mechanism 16 moves in a direction of the hollow arrow while rotating in a direction of the arrow indicated in FIG. 2C, with the result that the powder supplied in the powder supply portion 13 to the upper surface of the working base 12 is transferred. Here, the rotation direction of the powder transfer mechanism 16 is a direction opposite to a direction in which the powder supply portion 13 is assumed to be rotated by a friction of the powder transfer mechanism 16 and the modeling portion 14 when the powder transfer mechanism 16 is rotatably moved in the direction of the hollow arrow. In this manner, by transferring the powder by the powder transfer mechanism 16, the gap provided on the upper surfaces of the cured layer and uncured powder layer in the modeling portion 14 is filled with the powder and a powder layer uniformly leveled is formed.

The inkjet line head 17 and the heater 18 are moved in conjunction with the powder transfer mechanism 16 that passes through the modeling portion 14, discharges the excessive amount of powder to the powder discharge portion 15, and then returns to the standby position. Specifically, the inkjet line head 17 and the heater 18 are moved in a direction indicated by the hollow arrow shown in FIG. 2D from the standby positions thereof to the front of the standby position of the powder transfer mechanism 16 beyond the modeling portion 14.

Then, as shown in FIG. 2E, the inkjet line head 17 injects the water-based ink on the uppermost powder layer formed in the modeling portion 14 while returning back to the standby position. Thus, the water-based ink infiltrates into the powder layer and the powder is dissolved, and when the water-based ink is evaporated and solidified thereafter, a cured layer is formed.

In addition, the heater 18 is moved together with the inkjet line head 17 and heats the powder layer on which the water-based ink is injected by the inkjet line head 17. Thus, the water-based ink injected by the inkjet line head 17 is suppressed from infiltrating into an uncured powder layer located lower than the uppermost powder layer.

Here, the lid 17A that covers the injection ports (not shown) of the inkjet line head 17 opens the injection ports in the step in which the inkjet line head 17 moves while injecting the ink as shown in FIG. 2E, and isolates the injection ports from an external, dry environment so that the ink within the injection ports is not dried in steps other than the above step. Further, the heater 18 generates heat in a step of heating while moving above the powder layer, and in steps other than the step, for example, power supply to an electrically-heated wire is stopped.

Then, the inkjet line head 17 and the heater 18 return back to the standby positions thereof and enter the state shown in FIG. 2A. Such steps are repeated by the number of cured layers constituting a modeled object in the modeling apparatus 11, with the result that a modeled object is formed. At a time when the modeling is ended, the modeled object is covered with an uncured powder layer and taken out of the uncured powder layer. For example, in the modeling apparatus 11, a modeled object is formed under conditions as follows.

For powder to be a material of a modeled object, one having components mixing salt of 90 wt %, magnesium sulfate of 5 wt %, and polyvinylpyrrolidone of 5 wt % is used. Further, as the water-based ink, one used in an inkjet printer commercially available is used for the color inks, and one mixing distilled water and ethyl alcohol in a ratio of weight of 1:1 is used for the colorless ink.

Further, as the modeling area, a rectangular area of 20 cm in the X direction and 30 cm in the Y direction is prepared, for example. In addition, a thickness of one powder layer is set to 0.1 mm, that is, the table 14A of the modeling portion 14 (FIG. 2) is controlled to descend by 0.1 mm. Then, the powder of the above components is accommodated in the powder supply portion 13, powder whose amount is at least 30% or more larger than an amount necessary for forming one powder layer in the modeling area is pushed out from the powder supply portion 13, and that amount of powder is transferred to the modeling area by the powder transfer mechanism 16. Thus, a powder layer having a thickness of 0.1 mm is uniformly formed in the modeling area.

Further, for the inkjet line head 17, one with a line shot system in which a pitch of injection ports is 600 dpi is used. For the heater 18, one that is provided with a reflector plate and whose voltage is 100 V and powder consumption is 300 W is used.

By forming a modeled object as described with reference to FIG. 2 by the modeling apparatus 11 under the conditions as described above, it is possible to form a modeled object that is fully-colored thereinto and has a higher strength than in the past. For example, a modeled object with such a strength that the modeled object is not broken when dropped from the height of 1 m onto a tile floor can be formed.

Figure 3:
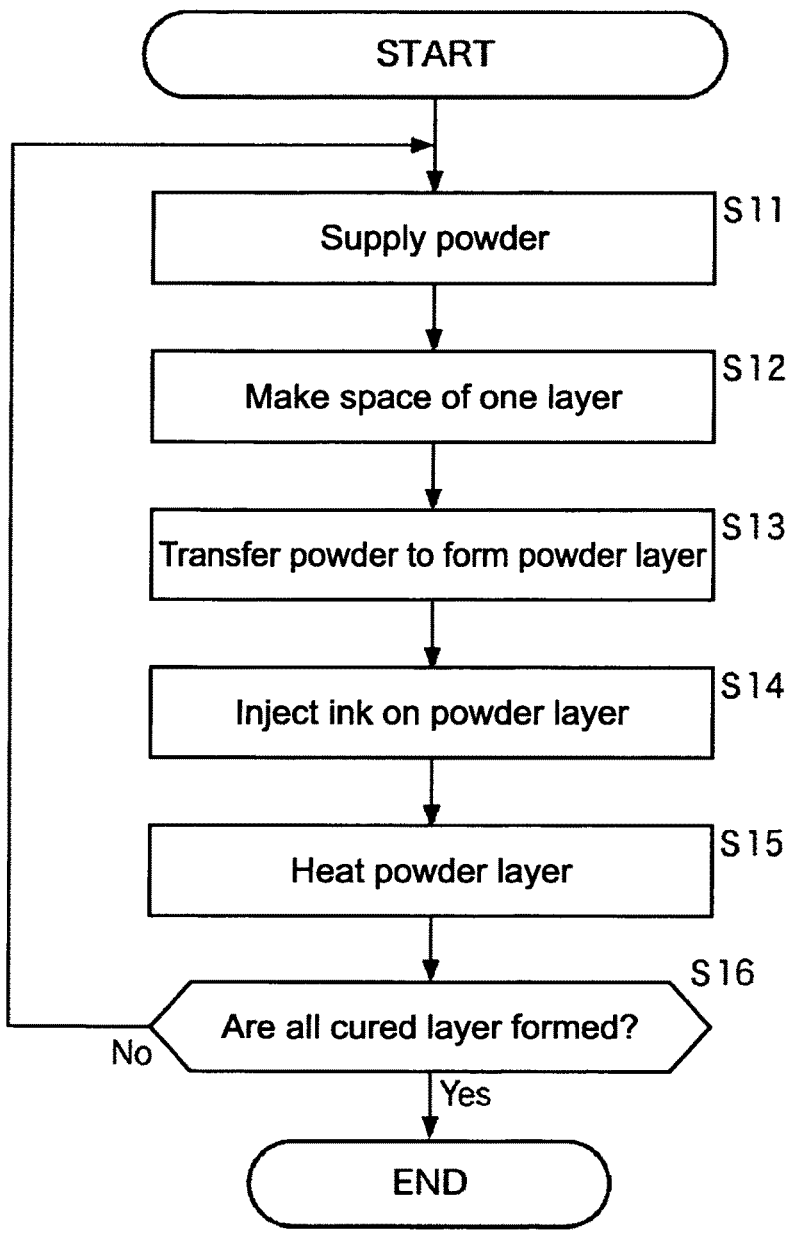
FIG. 3 is a flowchart for explaining processing of forming a modeled object by the modeling apparatus 11.

Next, FIG. 3 is a flowchart for explaining processing of forming a modeled object by the modeling apparatus 11 of FIG. 1.

In Step S11, the powder supply portion 13 pushes up the powder accommodated therein and supplies powder whose amount is a little larger than that of one layer above the upper surface of the working base 12, and the processing proceeds to Step S12.

In Step S12, the modeling portion 14 lowers the table 14A in accordance with the thickness of one powder layer and provides a gap having the thickness of one powder layer between the upper surfaces of the cured layer and uncured powder layer and the upper surface of the working base 12.

After the processing of Step S12, the processing proceeds to Step S13. The powder transfer mechanism 16 transfers the powder located above the upper surface of the working base 12 in the powder supply portion 13 while rotating in the direction of the arrow indicated in FIG. 2C. Then, the powder transfer mechanism 16 fills the gap provided on the upper surfaces of the cured layer and uncured powder layer in the modeling portion 14 with the powder to thereby form a powder layer, and the processing proceeds to Step S14.

In Step S14, the inkjet line head 17 and the heater 18 move, in conjunction with the powder transfer mechanism 16 returning back to the standby position, to the front of the standby position thereof. The inkjet line head 17 injects the water-based ink in an area of the powder layer formed in the modeling portion 14, the area corresponding to a cross-sectional shape of the modeled object, while returning back to the standby position thereof. The powder layer is dissolved by the water-based ink injected on the cross-sectional shape of the modeled object in this manner and when the water-based ink is evaporated thereafter, a cured layer corresponding to the cross-sectional shape is formed.

In Step S15, the heater 18 moves together with the inkjet line head 17 after the inkjet line head 17, thus heating the powder layer on which the water-based ink is injected by the inkjet line head 17. Then, when the inkjet line head 17 and the heater 18 return to the standby positions, the processing proceeds to Step S16.

In Step S16, a control portion that controls the whole modeling apparatus 11 (for example, computer of FIG. 4 to be described later) judges whether all cured layer are formed. Specifically, in the modeling apparatus 11, cross-sectional shape data obtained by slicing three-dimensional data of a modeled object is created and the water-based ink is injected on powder layers laminated in the modeling portion 14 in accordance with the cross-sectional shape data, thus forming cured layers sequentially. If powder layers from the lowermost layer to the uppermost layer are laminated and control for injection of the water-based ink corresponding to the all cross-sectional shape data created by slicing is performed, it is judged that all the cured layers are formed.

In a case where it is judged in Step S16 that all the cured layer are not formed, the processing returns to Step S11 and similar processing is repeated thereafter. On the other hand, it is judged that all the cured layers are formed, a modeled object is completed and the processing is ended.

As described above, a water-based ink is injected on powder layers by inkjet by the modeling apparatus 11 and the layers are heated one by one, with the result that a modeled object with high accuracy and high strength can be formed.

Specifically, by heating the layers one by one, excessive moisture supplied to a powder layer is reliably evaporated and prevented from infiltrating (smearing) into an uncured powder layer formed below the powder layer or subsequent layer formed thereabove. Thus, the solidification due to the excessive moisture infiltrating into areas other than the area corresponding to the cross-sectional shape of the modeled object is avoided, with the result that a reduction in dimension accuracy can be suppressed.

Further, since a modeled object using salt (hereinafter, referred to as saline modeled object as appropriate) is soluble in water and has properties of high heat resistance, the modeled object can be used as a mold for injection-molding and blow-molding that is manufactured by a casting method, for example. The mold as a saline modeled object can be dissolved in water after the casting and therefore becomes a high-functional mold in which pipes for cooling, heating, and degassing can be freely arranged. In addition, a zinc alloy or aluminum alloy can be used as casting metal. By applying the saline modeled object to a mold for a large-size molded object, a mold can be manufactured at lower costs and a molding cycle can be shortened.

Further, since the saline modeled object has an excellent whiteness level and excessive diffusion of the water-based ink is suppressed, the saline modeled object has excellent color developability. As a result, a modeled object formed in full color can achieve a quality level usable in the field of consumer use. In addition, it is assumed that a modeled object in the consumer field is touched by an indefinite number of persons, but the saline modeled object is excellent in safety for a human body and has less risk that a baby swallows the saline modeled object because it is salty. Moreover, there is an advantage that harmful components are not emitted when discarded, with the result that the saline modeled object can be used with peace in mind in the consumer field handled by an indefinite number of persons.

In recent years, many three-dimensional digital contents (data representing a three-dimensional shape by numerical model) are present on the web due to the diffusion of the Internet, and the modeling apparatus 11 is assumed to be applied to the consumer field by using an output of those three-dimensional digital contents, that is, modeling of a modeled object based on the three-dimensional digital contents.

Further, the saline modeled object is excellent in recyclability capable of reusing powder by crushing the modeled object, which is earth-friendly. As a result, the saline modeled object is expected to be used not only in the past industrial field or medical field but also in the consumer field that is expected to be developed in the future. Particularly, the recyclability has a great effect of reducing wastes. Even when the saline modeled object is discarded, the saline modeled object can be safely discarded because it does not contain harmful substances.

Further, as described above, the modeling apparatus 11 uses the inkjet line head 17 of the line head system, with the result that the water-based ink can be injected at one time (substantially at the same time) in a line direction and the inkjet line head 17 can be moved at higher speed than in a system of injecting the water-based ink while moving a head in the line direction (system of a general inkjet printer). As a result, it is possible to shorten not only a time necessary for forming a modeled object but also a time during which the inkjet line head 17 is present under a dry atmosphere, with the result that drying of the water-based ink can be avoided. Further, the drying of the water-based ink is also avoided by providing the lid 17A to the inkjet line head 17 and isolating the injection ports of the inkjet line head 17 by the lid 17A except in the step of injecting the water-based ink.

It should be noted that in this embodiment, the water-based ink is injected on the powder layer by the inkjet line head 17 and thereafter the powder layer is heated by the heater 18. However, the powder layer may be heated, for example, after the powder layer is formed and before the water-based ink is injected.

As described above, when the powder layer is heated before the water-based ink is injected, there is caused, for example, a state where excessive moisture contained in the cured layer below the powder layer formed on the uppermost surface is evaporated and moisture adsorbed by the uppermost powder layer is also eliminated. Alternatively, a certain amount of moisture (adsorbed moisture) is kept in the uppermost powder layer.

In such a state, by injecting the water-based ink, it is possible to form a cured layer with high accuracy (high resolution and high dimension accuracy) by the uppermost powder layer because the excessive moisture (water-based ink) of the cured layer below the uppermost powder layer is suppressed from being diffused, and to form a modeled object with high accuracy eventually. In addition, the color developability of a modeled object is improved by suppressing the diffusion of the water-based ink. Moreover, since the solubility of powder is increased by heating the powder layer before the water-based ink is injected, the powder is reliably dissolved by the water-based ink, with the result that the strength of a modeled object can be increased.

It should be noted that if the powder layer can be heated appropriately as described above, a modeled object with high accuracy and high strength can be formed and, for example, the powder supply portion 13 may be structured to include a heater that heats the vicinity of an upper portion thereof. In this case, the powder supplied by being pushed out from the powder supply portion 13 has enough heat to moderately evaporate the water-based ink and a modeled object with high accuracy and high strength can be formed without performing the heating by the heater 18.

Further, it may be possible to provide the heaters 18 on both sides of the inkjet line head 17 to heat the powder before and after the water-based ink is injected.

Further, though the five water-based inks including the four color inks of cyan, magenta, yellow, and black and a transparent colorless ink are used for the water-based ink in this embodiment, it may be possible to use only color inks or colorless inks.

Further, the series of processing performed in the modeling apparatus 11 is performed by, for example, executing software by a computer that controls the respective portions of the modeling apparatus 11. In this case, a program constituting the software is installed from a program recording medium to a computer incorporated in dedicated hardware, a general-purpose personal computer capable of executing various functions by installing various programs, or the like.

Figure 4:
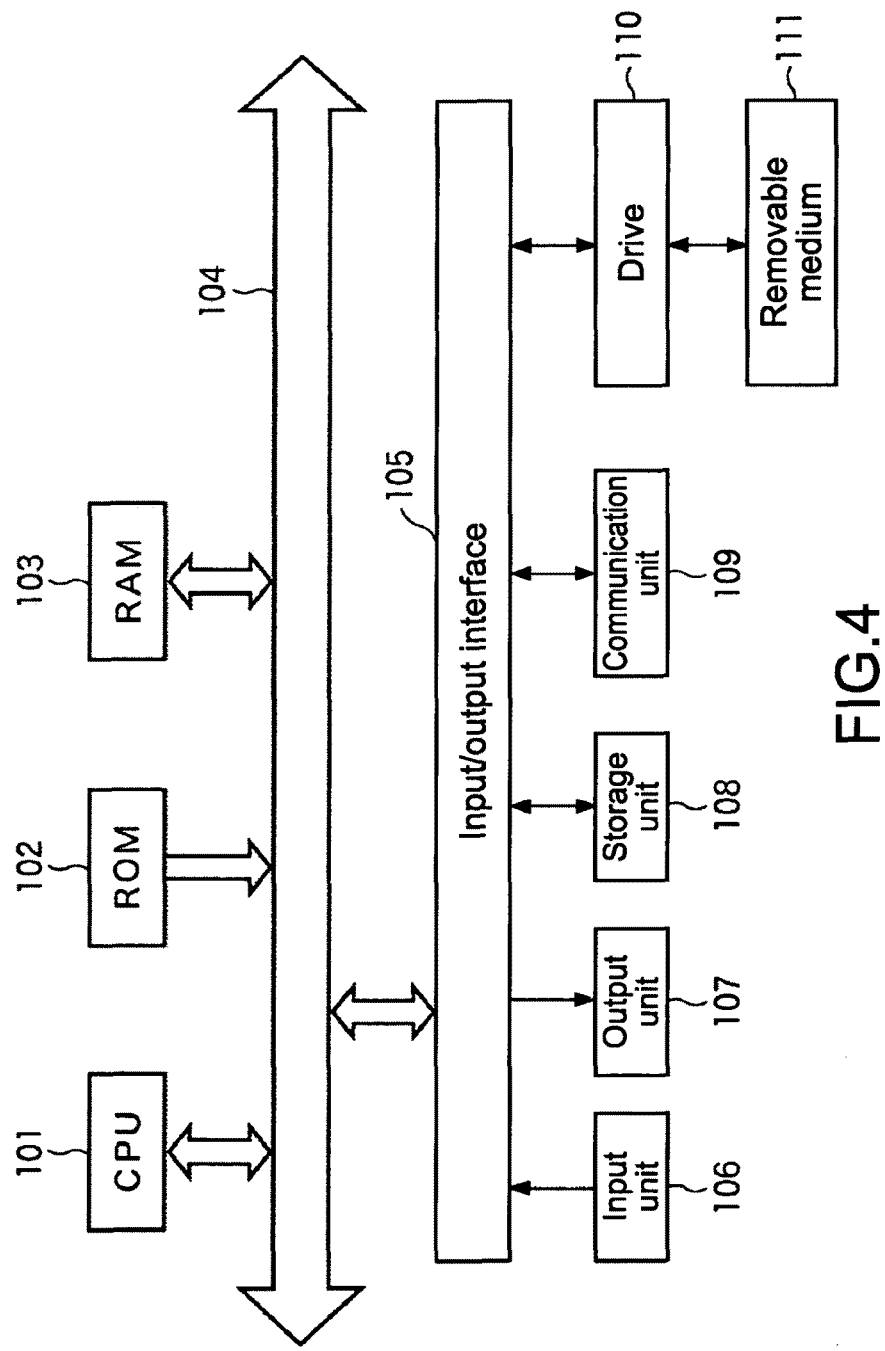
FIG. 4 is a block diagram showing a structural example of hardware of a computer.

FIG. 4 is a block diagram showing a structural example of hardware of a computer that executes the series of processing described above by a program.

In the computer, a CPU (Central Processing Unit) 101, a ROM (Read Only Memory) 102, and a RAM (Random Access Memory) 103 are connected to each other via a bus 104.

An input/output interface 105 is also connected to the bus 104. Connected to the input/output interface 105 are an input unit 106 such as a keyboard, a mouse, and a microphone, an output unit 107 such as a display and a speaker, a storage unit 108 such as a hard disk and a nonvolatile memory, a communication unit 109 such as a network interface, and a drive 110 that drives a removable medium 111 such as a magnetic disc, an optical disc, a magneto-optical disc, and a semiconductor memory.

In the computer structured as described above, the CPU 101 loads a program stored in, for example, the storage unit 108 to the RAM 103 via the input/output interface 105 and the bus 104 to execute the program, thus performing the series of processing described above.

The program to be executed by the computer (CPU 101) is provided by, for example, being recorded on the removable medium 111 as package medium such as a magnetic disc (including a flexible disc), an optical disc (such as a CD-ROM (Compact Disc-Read Only Memory) and a DVD (Digital Versatile Disc)), a magneto-optical disc, and a semiconductor memory, or provided via a wired or wireless transmission medium such as a local area network, the Internet, and digital satellite broadcasting.

Then, the program can be installed in the storage unit 108 via the input/output interface 105 by mounting the removable medium 111 to the drive 110. Further, the program can be received by the communication unit 109 via a wired or wireless transmission medium and installed in the storage unit 108. In addition, the program can be installed in advance in the ROM 102 or the storage unit 108.

It should be noted that the program executed by the computer may be a program with which processing is performed in chronological order along the order described herein, or may be a program with which processing is performed in parallel or at a necessary timing when a calling is made or the like. Further, the program may be one processed by one CPU or one processed in a distributed manner by a plurality of CPUs.

FIG. 5 is a table indicating results of an experiment in which a time until when a modeled object is dried naturally after formed is measured with and without heat treatment using the heater 18. Conditions of the experiment are shown below.

A salt material was used as the powder.

A size of a test piece as a modeled object was 15 mm×15 mm×42 mm.

As to test pieces formed without heating (two of N1 and N2) and test pieces formed while powder layers were heated one by one at a temperature of 120° C. (two of H1 and H2), drying times thereof were measured and average values thereof were calculated. Specifically, a commercially-available heating/drying moisture analyzer (model No. MX-50; A&D Company, Limited) was used to measure a time until when a setting value of 180° C. and an amount of moisture change of 0.05%/min were obtained.

As shown in the table, in the case with the heating, excessive moisture was evaporated and thus the effect of shortening about 12% of the drying time was obtained as compared to the case without heating. This leads to high-speed formation of a modeled object.

Figure 7:
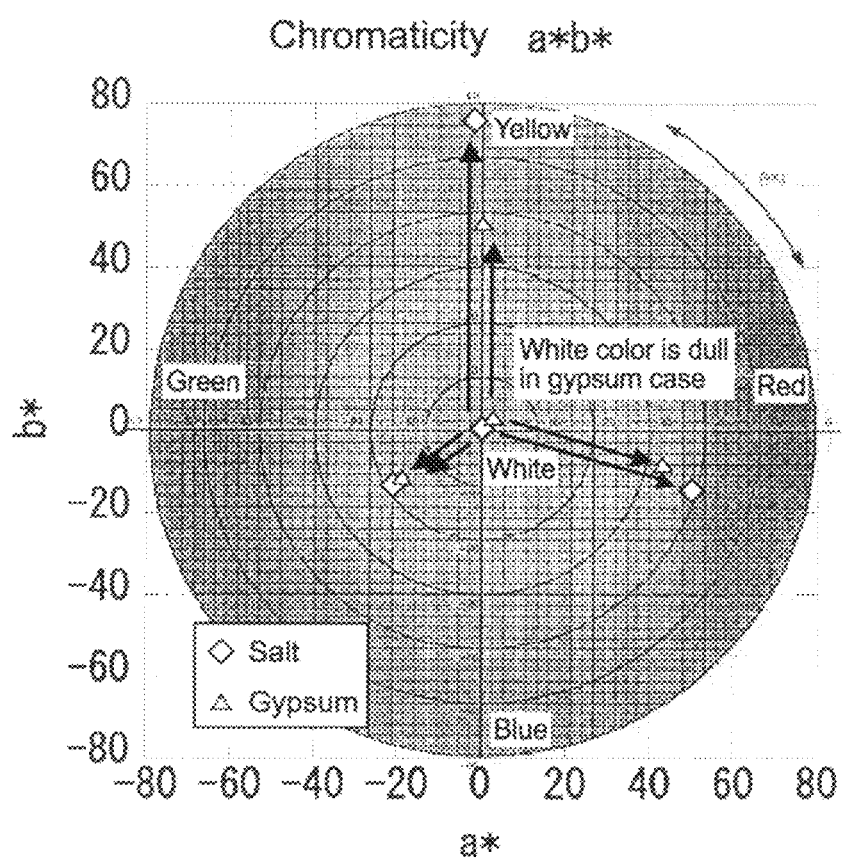
FIG. 7 is a chromaticity diagram obtained based on the table of FIG. 6.

FIG. 6 is a table indicating results of an experiment in which color developability of a modeled object made of a salt material and that of a modeled object made of a gypsum material are compared. FIG. 7 is a chromaticity diagram obtained based on that table. Conditions of the experiment are shown below.

A size of a test piece was 15 mm×15 mm×42 mm.

As to the test piece whose surface of 15 mm×42 mm was colored, an optical density, lightness, and chromaticity were measured using a hue/chromaticity meter (model No. X-Rite 530; X-Rite Incorporated).

As a result of this experiment, the test piece made of the salt material was superior to the test piece made of the gypsum material in chroma of all colors of cyan, magenta, and yellow. In addition, the test piece made of the salt material was lower in optical density and higher in lightness regarding white. The test piece made of the salt material shows substantially zero chromaticity of white, which is an excellent result as compared to the white of the test piece made of the gypsum material.

From the above, the results indicating that the modeled object made of the salt material is superior to the modeled object made of the gypsum material in color developability were obtained.

The embodiment of the present invention is not limited to the embodiment described above and can be variously modified without departing from the gist of the present invention.

DESCRIPTION OF REFERENCE NUMERALS

11 modeling apparatus
12 working base
13 powder supply portion
14 modeling portion
14A table
15 powder discharge portion
16 powder transfer mechanism
17 inkjet line head
17A lid
18 heater
19 dehumidification portion
20 drive shaft

The invention claimed is:

1. A modeling apparatus comprising:
 a liquid supply mechanism that is moveable from a standby region of the modeling apparatus toward a modeling region of the modeling apparatus to deposit a liquid onto a powder in the modeling region, the modeling region is between the standby region and a supply region of the modeling apparatus;
 a powder transfer mechanism that is moveable from the supply region toward the liquid supply mechanism to transfer the powder from the supply region to the modeling region, the powder transfer mechanism is configured to move from the supply region toward the liquid supply mechanism when the liquid supply mechanism is at the standby region; and
 a heating mechanism between the liquid supply mechanism and the powder transfer mechanism, the heating mechanism is configured to simultaneously radiate the liquid in the modeling region and the powder in the modeling region with heat.

2. The modeling apparatus according to claim 1, wherein the liquid supply mechanism is configured to travel simultaneously with the heating mechanism in a pathway along a direction.

3. The modeling apparatus according to claim 1, wherein the powder transfer mechanism is moveable from the supply region toward the liquid supply mechanism before the liquid supply mechanism deposits the liquid onto the powder.

4. The modeling apparatus according to claim 1, wherein the powder transfer mechanism is moveable from the supply region toward the liquid supply mechanism before the liquid supply mechanism moves from the standby region toward the modeling region.

5. The modeling apparatus according to claim 1, further comprising:
 a heater unit configured to heat a powder at a supply region of the modeling apparatus, the heater unit is located at the supply region.

6. The modeling apparatus according to claim 5, wherein the heater unit is configured to heat a vicinity of an upper portion of the supply region.

7. The modeling apparatus according to claim 1, wherein a laminated powder layer is in the modeling region, the liquid combined with the powder is the laminated powder layer.

8. The modeling apparatus according to claim 7, wherein the heating mechanism is moveable away from the powder transfer mechanism when radiating the laminated powder layer.

9. The modeling apparatus according to claim 7, wherein the liquid supply mechanism is configured to deposit the liquid onto an uncured layer, the uncured layer is the powder in the modeling region that is radiated with the heat.

10. The modeling apparatus according to claim 9, wherein the heating mechanism is configured to radiate the heat onto a liquefied uncured layer in the modeling region, the liquefied uncured layer includes the uncured layer and the liquid.

11. The modeling apparatus according to claim 10, wherein the heat converts the liquefied uncured layer into the laminated powder layer.

12. The modeling apparatus according to claim 1, wherein the heating mechanism is configured to radiate far infrared rays.

13. The modeling apparatus according to claim 12, wherein the far infrared rays having a wavelength of 4 μm to 1,000 μm.

14. The modeling apparatus according to claim 1, further comprising:
a dehumidification portion configured to remove water vapor from an atmosphere in a vicinity of the modeling region.

15. The modeling apparatus according to claim 1, wherein the liquid supply mechanism is configured to deposit the liquid onto the powder in the modeling region after the powder has been heated.

16. The modeling apparatus according to claim 1, further comprising:
a lid configurable to enclose injection ports of the liquid supply mechanism.

17. The modeling apparatus according to claim 16, wherein the lid is configured to permit an injection of the liquid from the injection ports only when the liquid supply mechanism deposits the liquid onto the laminated powder layer.

18. The modeling apparatus according to claim 1, wherein the powder transfer mechanism is a roller.

19. The modeling apparatus according to claim 1, wherein the powder is a water-soluble powder.

20. The modeling apparatus according to claim 1, wherein the powder is a combination of salt as a main component and at least one of magnesium sulfate and polyvinylpyrrolidone.

21. The modeling apparatus according to claim 1, wherein the liquid is a water-based ink, the liquid supply mechanism is configured to deposit the water-based ink onto the laminated powder layer.

22. The modeling apparatus according to claim 1, wherein the liquid is from the group consisting of a color ink, a colorless ink, and a solution that contains water and alcohol.

* * * * *